(12) United States Patent
Vihinen

(10) Patent No.: US 6,990,332 B2
(45) Date of Patent: Jan. 24, 2006

(54) METHOD AND SYSTEM FOR TRANSMITTING SUBSCRIBER-SPECIFIC INFORMATION IN A TELECOMMUNICATION SYSTEM

(75) Inventor: Seppo Vihinen, Vantaa (FI)

(73) Assignee: Sonera Oyj, Helsinki (FI)

( * ) Notice: Subject to any disclaimer, the term of this patent is extended or adjusted under 35 U.S.C. 154(b) by 536 days.

(21) Appl. No.: 09/919,404

(22) Filed: Jul. 31, 2001

(65) Prior Publication Data

US 2002/0022477 A1 Feb. 21, 2002

(30) Foreign Application Priority Data

Feb. 2, 1999 (FI) .................................. 990193
Jan. 31, 2000 (WO) ...................... PCT/FI00/00063

(51) Int. Cl.
*H04M 3/42* (2006.01)
(52) U.S. Cl. ...................... 455/414.1; 379/142.04; 379/216.01
(58) Field of Classification Search ............ 379/142.01, 379/142.02, 142.03, 142.04, 142.05, 142.06, 379/142.14, 142.13, 93.12, 201, 355, 216; 455/414
See application file for complete search history.

(56) References Cited

U.S. PATENT DOCUMENTS

| | | | | |
|---|---|---|---|---|
| 5,182,766 A | * | 1/1993 | Garland | 379/216.01 |
| 5,345,501 A | * | 9/1994 | Shelton | 379/88.2 |
| 5,465,295 A | * | 11/1995 | Furman | 379/221.14 |
| 5,561,705 A | * | 10/1996 | Allard et al. | 455/564 |
| 6,028,921 A | * | 2/2000 | Malik et al. | 379/201.04 |
| 6,195,541 B1 | * | 2/2001 | Griffith | 455/406 |
| 6,259,780 B1 | * | 7/2001 | Sherwood et al. | 379/142.01 |
| 6,711,402 B1 | * | 3/2004 | Chelliah et al. | 455/415 |

FOREIGN PATENT DOCUMENTS

| FI | 972323 | 12/1998 |
|---|---|---|
| WO | WO 97/29584 | 8/1997 |
| WO | WO 99/03252 | 1/1999 |

* cited by examiner

*Primary Examiner*—Fan Tsang
*Assistant Examiner*—Olisa Anwah
(74) *Attorney, Agent, or Firm*—Cohen, Pontani, Lieberman & Pavane

(57) ABSTRACT

The inventive method and system enable an increase in the amount of information that may be transmitted from a call-initiating first telecommunication terminal to an automated application or device or machine or the like in conjunction with the call request. The content of the A-number field to be transmitted from a conversion/transmission center to a destination second telecommunication terminal is modified by adding control information to the A-number field. This control information is used to control an actuating device that is connected to the second telecommunication terminal and which operates or forms a part of the automated application or device or machine.

14 Claims, 1 Drawing Sheet

METHOD AND SYSTEM FOR TRANSMITTING SUBSCRIBER-SPECIFIC INFORMATION IN A TELECOMMUNICATION SYSTEM

BACKGROUND OF THE INVENTION

1. Field of the Invention

The present invention relates to telecommunication systems and, in particular, to a method and system for enabling an increased volume of information flow between telecommunication terminals.

2. Description of Related Art

Dialing information in the public switched telephone network (PSTN) was at first generated in the form of pulses. This manner of operation did not however allow the transmission of call-specific supplementary information. Next to be used after pulse dialing, and still commonly in use, is tone frequency dialing. As compared with pulse dialing, tone frequency dialing advantageously provides for faster dialing and the ability to send supplementary information after the conventional dialing string destination digits. In mobile communication systems, such as the GSM (Global System for Mobile communications) system, the reception of calls has become less dependent on location, and mobile communication systems have set the scene for the rise of a new form of communication, the short message service. In accordance with natural development, new systems bring about new services and solutions that improve customer satisfaction.

In the ISDN (Integrated Services Digital Network) system and most mobile communication systems, information regarding identifying the calling party, i.e. the A-number, can be transmitted along with call-specific signaling. In practice, this appears at the receiving terminal as an identifier of the calling party. Moreover, after the completion of call setup various functions can be selected by a caller or user via tone frequency selections based, for example, on a tone frequency menu. In such cases the telephone exchange may communicate with an intelligent peripheral (IP) or the like which is controlled by the tone frequency signals that it receives.

Nevertheless, the transmission of supplementary information to the receiving party's terminal following call setup is slow and, if the receiving number is a specially priced service number, often expensive. Using a data connection or a GSM text message, it is possible to communicate with, for example, an automated application or device. Such communication suffers from the slowness of call setup and variations in the transmission time of GSM text messages. An even more severe and significant problem is that, due to limitations relating to the permissible or acceptable length of the dialing string number, the amount of information that can be transmitted in the B-number or C-number of an initiated call is often insufficient to support or enable the remote operation of many automated applications.

OBJECTS AND SUMMARY OF THE INVENTION

It is accordingly the desideratum of the present invention to eliminate, or at least significantly alleviate, the drawbacks and deficiencies of heretofore known methods and apparatus, including by way of example those discussed above.

It is a specific object of the invention to provide a new type of method and system that will allow the transmission of larger amounts of information accompanying or together with a call request, particularly for use in communicating with various automated devices and applications.

In accordance with the inventive method, the A-number field that accompanies or is sent with a call request is used in a new and heretofore unknown way. Specifically, the A-number field can be replaced with subscriber-specific information, or such subscriber-specific information can be added to the normal A-number field. The invention thus makes it unnecessary to, for example, connect or open a separate speech channel for the transmission of additional information to accompany a call request; instead, the answering of the call is implemented as an acknowledgement that is sent to the call-initiating A-party and the telephone exchange. In addition, the numerical data that is carried in the modified A-number field can be readily analyzed using conventional methods and devices.

Broadly speaking, the method of the invention relates to the transmission of subscriber-specific supplementary information in a telecommunication system. The telecommunication system may by way of preferred and currently contemplated example comprise a telecommunication network, first and second telecommunication terminals, a conversion/transmission center and an actuating device. The first and second telecommunication terminals are connected to the conversion/transmission center via the telecommunication network, and the actuating device of the system is connected to the second telecommunication terminal.

In implementing the inventive method, information is transmitted from the first telecommunication terminal to the second telecommunication terminal, and optional numbers or digits are added to the intended receiver's normal identification number, i.e. the B-number which the A-party caller normally places in the dialing string to initiate a call. In the conversion/transmission center, the A-number field that is to be further transmitted is modified by appending to it the supplementary information that was appended to the B-number at the caller's first telecommunication terminal. Alternatively, the A-number field may be modified by replacing it with completely new information, as for example with the numbers that were appended to the B-number in the caller's dialing string. Information dependent on the geographic location of the first telecommunication terminal and/or on the time and/or other factors may also be added to the A-number field or may entirely replace that field. The actuating device that is connected to the second telecommunication terminal is controlled on the basis of the supplementary information contained in the modified A-number field that is transmitted to the second telecommunication terminal. A confirmation of execution of a control request (in accordance with the supplementary information) may be sent to the first telecommunication terminal, thereby providing for ready verification for the calling party of whether the desired control function has been successfully executed.

The system of the present invention comprises means for modifying the A-number field that is to be transmitted from the conversion/transmission center to the second telecommunication terminal by adding the supplemental or control information to that field, and means for controlling the actuating device with the information contained in the A-number field. Alternatively, the A-number field may be modified by replacing the original A-number field with the supplemental or control information.

The inventive system further comprises means for adding, to the A-number field to be transmitted from the conversion/transmission center, information dependent on the geographic location of the first telecommunication terminal and/or on the time and/or other factors. The conversion/ transmission center of the inventive system may for example be implemented by or in a telephone exchange, a message center, or a Voice Response Unit (VRU) such as an IBM Direct Talk product. In addition, the first and second telecommunication terminals may be mobile stations, or the first telecommunication terminal may be a telephone apparatus in the public switched telephone network.

As compared with prior art methods and systems, the present invention advantageously increases the amount of information that may be transmitted in conjunction or together with call initiating requests. A further advantage of the invention is that no separate speech channel need be utilized or connected for the transmission of such information. Yet another advantage of the present invention is that the information that is carried in the modified A-number field can be readily analyzed using simple methods and means.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE CURRENTLY PREFERRED EMBODIMENTS

Figure 1:
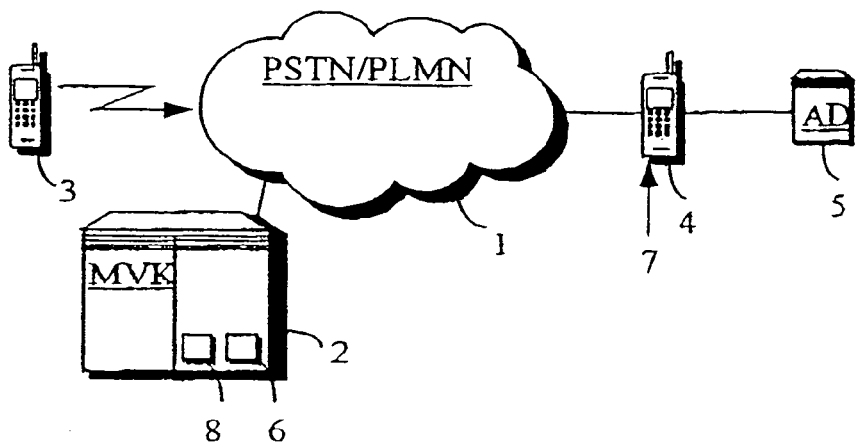
FIG. 1 is a block diagram of a currently preferred embodiment of a system in accordance with the present invention.

The system shown in FIG. 1 includes a telecommunication network 1 and a conversion/transmission center 2 that is connected to network 1. Telecommunication network 1 may for example be a Public Switched Telecommunications Network (PSTN) or a Public Land Mobile Network (PLMN). The FIG. 1 system further includes a first telecommunication terminal 3 and a second telecommunication terminal 4, which are connected via the telecommunication network 1 to the conversion/transmission center 2. The system additionally includes an actuating device 5—for, or implementing, an automated application—that is connected to the second telecommunication terminal 4.

Also included in the inventive system is a means 6 for modifying the A-number field that is to be sent from the conversion/transmission center 2 to the second telecommunication terminal 4 by adding control information to that A-number field, a means 7 for controlling the actuating device 5 based on the information contained in the modified A-number field, and a means 8 for adding, to the A-number field to be transmitted, information dependent on the geographic location of the first telecommunication terminal 3 and/or on the time and/or other factors. The means 6, 7 and 8 may be implemented in any known or apparent manner and will not therefore be further described in unnecessary detail.

Figure 2:
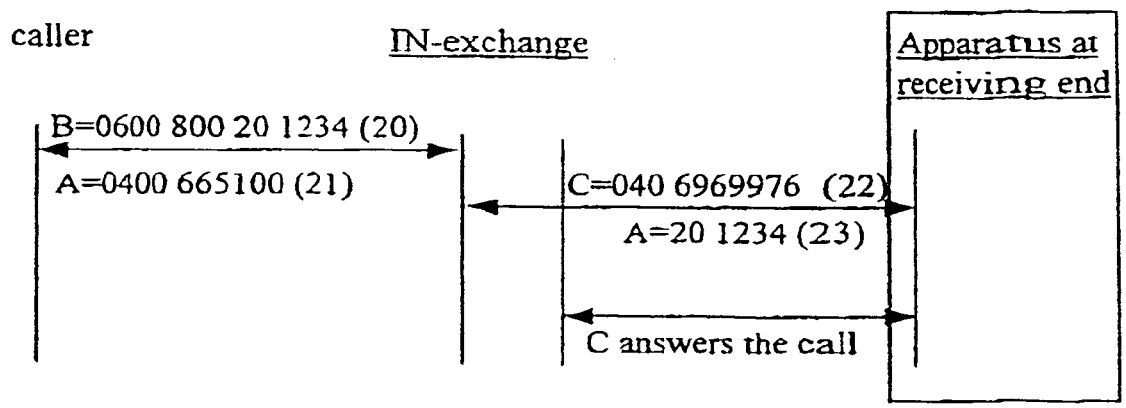
FIG. 2 depicts the method of operation of the system of FIG. 1 to utilize the functionality of an application presented by way of illustrative example.

FIG. 2 depicts the operation of the system of FIG. 1 to provide or take advantge of desired functionality for an automated application that is presented by way of illustrative example. In this particular example, a caller wishes to control a jukebox and, at step 20, calls from his mobile telecommunications terminal or other telephonic device using the dialing string or number 0600-800-20-1234. In the A-number field in call setup, the number 0400-665100 (i.e. the A-number which identifies the calling party) is transmitted (step 21). The exchange in the network, here by way of illustration an intelligent-network (IN), changes the number data in the A-number field into the number 20-1234 (step 23). At step 22, a number conversion is performed whereby the initially selected services number is set to the final number, i.e. the C-number. Here, the extra or additional numbers, 20-1234, that were appended to the telephone number string that was dialed by the initiating caller indicate that the caller is supplying to the jukebox by telephone a monetary input of 20 Finnish marks and wishes to have jukebox selection number "1234" played. The apparatus at the receiving end may for example be a telephone component that forms a part of or is contained in the automated jukebox apparatus, which receives the incoming information and controls the automated apparatus in accordance with the information that is contained in the modified A-number field. In this particular example, the service selected by the caller is charged for the selected service in the caller's telephone bill. The apparatus at the receiving end may alternatively be implemented as a numerical display device or a computer provided with the required software.

In an embodiment of the system according to FIG. 1, the A-party (0400-665100) calls the predetermined number of an automatic snack machine (0600-88500-XX) and wishes to pay or submit the monetary amount 18 marks by way of this call. Thus, in accordance with the invention the A-party dials the string or number 0600-88500-18. That number is converted in the conversion/transmission center, as for example in the telephone exchange, into the actual C-number of the automated snack device, which in this example is 040E-123465. The exchange announces the A-party identification as the number 0400-665100-18, and the automated device knows that the two last digits of the A-number represent the amount to be paid for the purchase as specified by the A-party. After the automated device has deciphered the A-number, its display will present a message, such as "Paid FIM 18", thereby indicating that the caller may now select products purchasable for the sum of FIM 18 from the device or machine.

While there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. In a method for transmitting subscriber-specific information in a telecommunication system that includes a telecommunication network, a conversion/transmission center connected to the telecommunication network, a first telecommunication terminal having an associated A-number and connected to the conversion/transmission center through the telecommunication network, a second telecommunication terminal having an associated B-number and connected to the conversion/transmission center through the telecommunication network, and an actuating device connected to the second telecommunication terminal, wherein connection-specific information is transmitted from the first telecommunication terminal to the second telecommunication terminal to effect a call from the first telecommunication terminal, and subscriber-specific optional parameters are added to a dialing string sent to the conversion/transmission center from the first telecommunication terminal to initiate the call such that the dialing string includes at least the B-number and the subscriber-specific optional parameters, the improvement comprising the steps of:

sending a dialing string including the B-number and subscriber-specific optional parameters from the first telecommunication terminal to the conversion/transmission center to initiate the call;

determining, at the conversion/transmission center, the B-number and the subscriber-specific optional parameters from the dialing string received from the first telecommunication terminal;

modifying an A-number field to be transmitted from the conversion/transmission center in the telecommunication network to the second telecommunication terminal in connection with the call by one of adding control information to the A-number field and replacing the A-number field with the control information, the control information comprising at least a portion of the subscriber-specific optional parameters in the dialing string sent to the conversion/transmission center from the first telecommunication terminal to initiate the call; and controlling the actuating device in accordance with the control information contained in the modified A-number field.

2. In a method in accordance with claim 1, further comprising the step of adding to the A-number field, in the conversion/transmission center, information dependent on one of a geographic location of the first telecommunication terminal, time and other factors.

3. In a method in accordance with claim 1, further comprising the step of transmitting the control information added to the A-number field in conjunction with a call request.

4. In a method in accordance with claim 1, further comprising the step of transmitting to the first telecommunication terminal a confirmation of execution of a control request defined by the control information for controlling the actuating device.

5. In a method in accordance with claim 1, further comprising the steps of transmitting to the first telecommunication terminal, by answering of the call at the second telecommunication terminal, a confirmation of execution of a control request defined by the control information for controlling the actuating device.

6. In a system for transmitting subscriber-specific information in a telecommunication system that includes a telecommunication network, a conversion/transmission center connected to the telecommunication network, a first telecommunication terminal having an associated A-number and connected to the conversion/transmission center through the telecommunication network, a second telecommunication terminal having an associated B-number and connected to the conversion/transmission center through the telecommunication network, and an actuating device connected to the second telecommunication terminal, wherein system information is transmitted from the first telecommunication terminal to the second telecommunication terminal to effect a call from the first telecommunication terminal, and subscriber-specific optional parameters are added to a dialing string sent to the conversion/transmission center from the first telecommunication terminal to initiate the call such that the dialing string includes at least the B-number and the subscriber-specific optional parameters, the improvement comprising:

means for sending a dialing string including the B-number and subscriber-specific optional parameters from the first telecommunication terminal to the conversion/transmission center to initiate the call;

means for determining, at the conversion/transmission center, the B-number and the subscriber-specific optional parameters from the dialing string received from the first telecommunication terminal:

means for modifying an A-number field to be transmitted from the conversion/transmission center in the telecommunication network to the second telecommunication terminal in connection with the call by adding control information to the A-number field, the control information comprising at least a portion of subscriber-specific optional parameters in the dialing string sent to the conversion/transmission center from the first telecommunication terminal to initiate the call; and means for controlling the actuating device in accordance with the control information contained in the modified A-number field.

7. In a system in accordance with claim 6, further comprising means for adding to the A-number field information dependent on one of a geographic location of the first telecommunication terminal, time and other factors.

8. In a system in accordance with claim 6, wherein the conversion/transmission center comprises a telephone exchange.

9. In a system in accordance with claim 6, wherein the conversion/transmission center comprises a message center.

10. In a system in accordance with claim 6, wherein the conversion/transmission center comprises a voice response unit.

11. In a system in accordance with claim 6, wherein the first telecommunication terminal comprises a mobile station.

12. In a system in accordance with claim 6, wherein the second telecommunication terminal comprises a mobile station.

13. In a system in accordance with claim 6, wherein the first telecommunication terminal comprises a telephone apparatus in a public switched telephone network.

14. In a system in accordance with claim 6, wherein the second telecommunication terminal comprises a numerical display device.

* * * * *

UNITED STATES PATENT AND TRADEMARK OFFICE
CERTIFICATE OF CORRECTION

| | | |
|---|---|---|
| PATENT NO. | : 6,990,332 B2 | Page 1 of 1 |
| APPLICATION NO. | : 09/919404 | |
| DATED | : January 24, 2006 | |
| INVENTOR(S) | : Seppo Vihinen | |

It is certified that error appears in the above-identified patent and that said Letters Patent is hereby corrected as shown below:

Please replace the foreign application priority data on the cover page with the following:

--This is a continuation of PCT Application No. PCT/FI00/00063, filed on January 31, 2000, which claims priority from Finland Application No. FI 990193, filed February 2, 1999.--

Please replace the foreign application priority data with the following:

--(30)    Foreign Application Priority Data
        February 2, 1999                           FI 990193

Please add the following to the cover page:

--(63)    Continuation Data
        This application is a continuation of PCT/FI00/00063 filed on January 31, 2000.--

Signed and Sealed this

Eleventh Day of July, 2006

JON W. DUDAS
*Director of the United States Patent and Trademark Office*